United States Patent
Sawala

(10) Patent No.: US 11,064,072 B1
(45) Date of Patent: Jul. 13, 2021

(54) CALLER STATE DETERMINATION

(71) Applicant: West Corporation, Omaha, NE (US)

(72) Inventor: Mayank Sawala, Omaha, NE (US)

(73) Assignee: West Corporation, Omaha, NE (US)

( * ) Notice: Subject to any disclaimer, the term of this patent is extended or adjusted under 35 U.S.C. 154(b) by 91 days.

(21) Appl. No.: 16/412,525

(22) Filed: May 15, 2019

(51) Int. Cl.
*H04M 3/51* (2006.01)
*G10L 25/63* (2013.01)
*G10L 15/26* (2006.01)

(52) U.S. Cl.
CPC .......... *H04M 3/5175* (2013.01); *G10L 15/26* (2013.01); *G10L 25/63* (2013.01); *H04M 3/5183* (2013.01)

(58) Field of Classification Search
CPC .......... G06N 99/00; G06N 5/04; G10L 25/63; G10L 15/26; G10L 15/02; G10L 25/48; G10L 25/51; G10L 25/54; H04M 3/42; H04M 3/50; H04M 3/51; H04M 3/5141; H04M 3/515; H04M 3/5158; H04M 3/5166; H04M 3/5175; H04M 3/5183; H04M 3/5191; H04M 3/527; H04M 3/53; H04M 3/5307; H04M 3/5322; H04M 3/5335; H04M 3/53358; H04M 3/53366; H04M 3/53383; H04M 3/53391
USPC ......... 704/270, 270.1, 272, 275; 706/10, 12, 706/13, 50, 62
See application file for complete search history.

(56) References Cited

U.S. PATENT DOCUMENTS

2018/0137432 A1* 5/2018 Chen ...................... G10L 15/02
2020/0092419 A1* 3/2020 Murali .................... G10L 25/63

* cited by examiner

*Primary Examiner* — Leshui Zhang

(57) ABSTRACT

In a call center, voice recordings of calls with callers can be analyzed to determine an emotional state metric, e.g. based on the pitch, volume, etc. of the voice sample waveform. A sentiment metric can be determined from words spoken in the sample. The emotional state metric and the sentiment metric may be combined to generate a caller state metric. The caller state metric may trigger subsequent actions, such as transferring calls to call agents or supervisors, and identifying points within voice scripts that can be improved.

20 Claims, 7 Drawing Sheets

CALLER STATE DETERMINATION

FIELD OF THE INVENTION

This disclosure relates to systems and methods for handling customer contact to a customer service center, in particular via voice calls.

BACKGROUND OF THE INVENTION

Customer service centers are used to handle various aspects of the customer/service provider relationship. These aspects may include new enquiries, sales, service queries, repairs, faults and complaints. A customer service center can be a cost efficient method for processing these forms of user contact and are therefore desirable from an enterprise point of view. However, many users can be disenchanted with the service center experience and may be reluctant to contact the service center if they feel that their enquiry is not handled well. This is particularly problematic for customers who have complaints, e.g. due to poor service, faulty products, or require assistance. If a customer is reluctant to contact the service center, the enterprise may not be afforded the opportunity to address the customer's concerns and thereby create a positive service experience for the customer that enhances customer relations.

What is required is an improved system and method for processing calls to a customer service center.

SUMMARY OF THE INVENTION

In one aspect of the disclosure, there is provided a call center configured to be engaged in a call with a caller. The call center may comprise one or more recording modules programmed to record a voice recording between a caller and the call center, a caller state module programmed to analyze a sample of a voice recording. The caller state module may be programmed to process the sample to determine an emotional state metric for the sample, process the sample to determine a sentiment state metric for the sample, and combine the emotional state metric and the sentiment state metric to generate a caller state metric for the sample.

In one aspect of the disclosure, there is provided a method for processing calls within a call center. The method may comprise recording a voice call with a customer by the call center, and analyzing a sample of the recording. Analyzing the sample may comprise processing the sample to determine an emotional state metric for the sample, processing the sample to determine a sentiment state metric for the sample, and combining the emotional state metric and the sentiment state metric to generate a caller state metric for the sample.

In one aspect of the disclosure, there is provided a non-transitory computer readable medium comprising instructions, that when read by a processor, cause the processor to perform processing a sample of a voice recording to determine an emotional state metric for the sample, processing the sample to determine a sentiment state metric for the sample, and combining the emotional state metric and the sentiment state metric to generate a caller state metric for the sample.

BRIEF DESCRIPTION OF THE DRAWINGS

Reference will now be made, by way of example only, to specific embodiments and to the accompanying drawings in which.

DETAILED DESCRIPTION OF THE INVENTION

To provide better handling of customer calls to a service center, the service center may be provided with enhanced analytical engines that are able to provide a higher degree of call analytics. In particular, a voice recording may be processed to estimate an emotional state of the caller and the sentiment of the call. A combined emotion and sentiment prediction, termed herein the caller state, may be used as a parameter for further handling of the call. In one embodiment, the caller state prediction can be determined in real-time and provided to the call agent, a supervisor, etc. to enable adjustments to how the call is handled. In one embodiment, the caller state prediction may come with a recommended course of action, such as to transfer to a supervisor or alternative call agent, prioritize a callback, make a special offer, etc.

In one embodiment, the analysis may be done at some time after completion of the call. The caller state prediction may be used to provide feedback to a call agent or supervisor for training. The prediction may also be used to develop improved service scripts by identifying points in the script that cause the caller state to improve or deteriorate.

Figure 1:
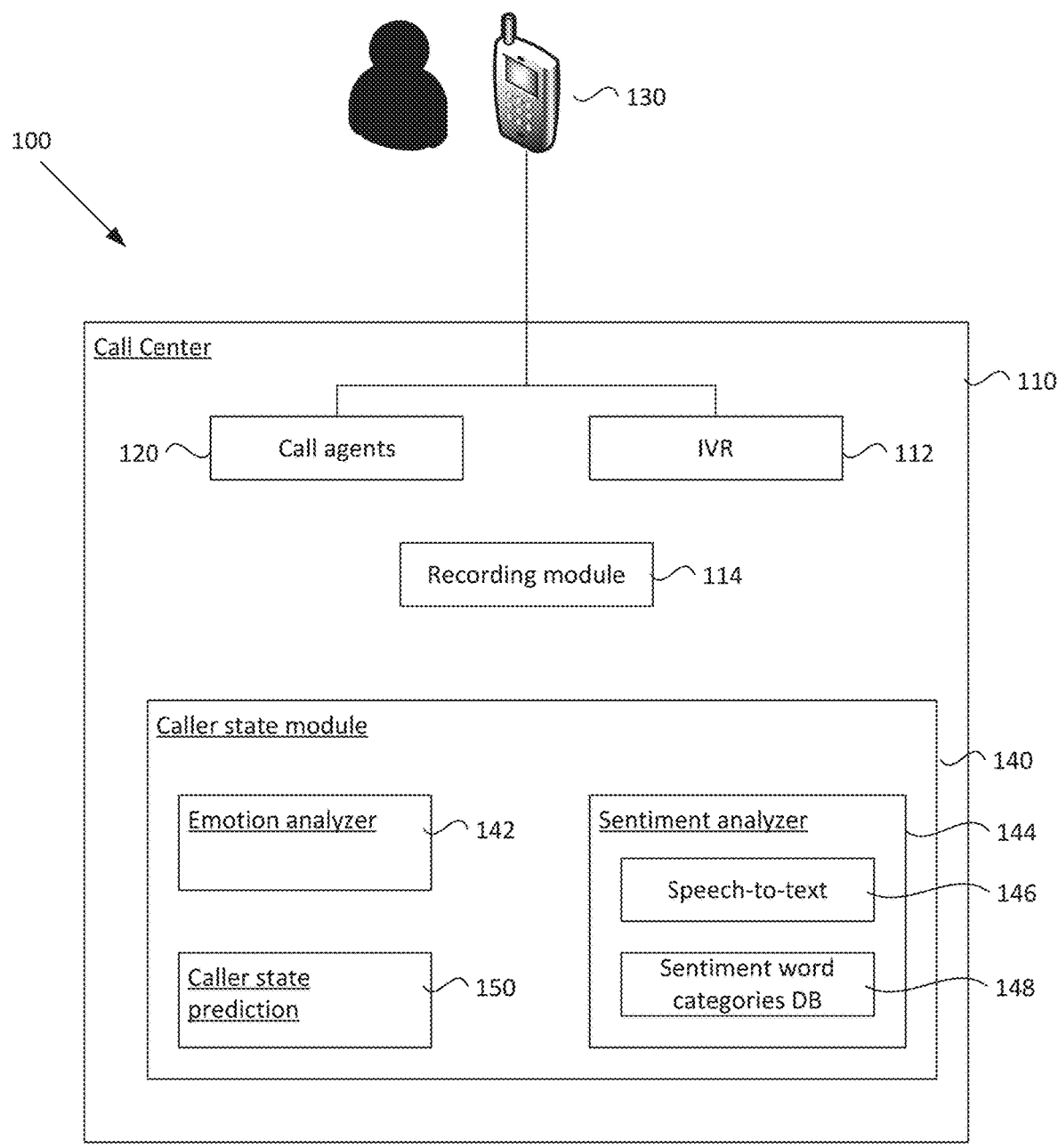
FIG. 1 shows a system diagram for a call center.

FIG. 1 shows a system diagram for determining a caller state. The system 100 includes a call center 110. The call center 110 includes computer componentry including processors, databases, memory, servers, routers, exchanges, etc. Call center componentry is generally well known in the art and the specific call center componentry is not considered pertinent to the present disclosure. Through the call center architecture, a user 130 is able to contact (or be contacted by), the call center 110. The call center 110 may include an Interactive Voice Response (IVR) system 112 and a plurality of call agents 120. As is known in the art, calls may initially be directed through the IVR 112 to determine initial parameters of the caller query and then, if required, route the call to the appropriate call agent 120.

The call center will typically include a recording module 114 including hardware including one or more processors and one or more memories. The recording module 112 may also include software for recording calls and for storing the recordings, either permanently or at least temporarily, the associated memory. In an embodiment of the present disclosure, the call center may include additional modules for processing call recordings, either in real-time or after the fact. Calls between the user 130 and the call center 110 may be recorded by the recording module 114. The recording module 114 may record voice files for calls with the IVR, 112, call agent 120, and with any additional voicemail systems that may be utilized when a call agent is required to handle a call but no call agent is available.

As shown in FIG. 1, the call center 110 may include a caller state module 140. The caller state module may include an emotion analyzer module 142 and a sentiment analyzer module 144. Each of the emotion analyzer module 142 and sentiment analyzer module 144 may utilize one or more processors and one or more operatively associated memories, which may include random access memory or the like for use in execution of programs, software, etc. as well as memory for temporary or permanent storage of data, software, etc.

The recording module 114 may be programmed to record voice conversations with customers and users in contact with the call center. Voice conversations may include interactive conversations with the IVR or a call agent as well as messages left by the caller on voicemail systems. Samples of voice recordings may be passed from the recording module 114 to the caller state module 140.

Figure 2:
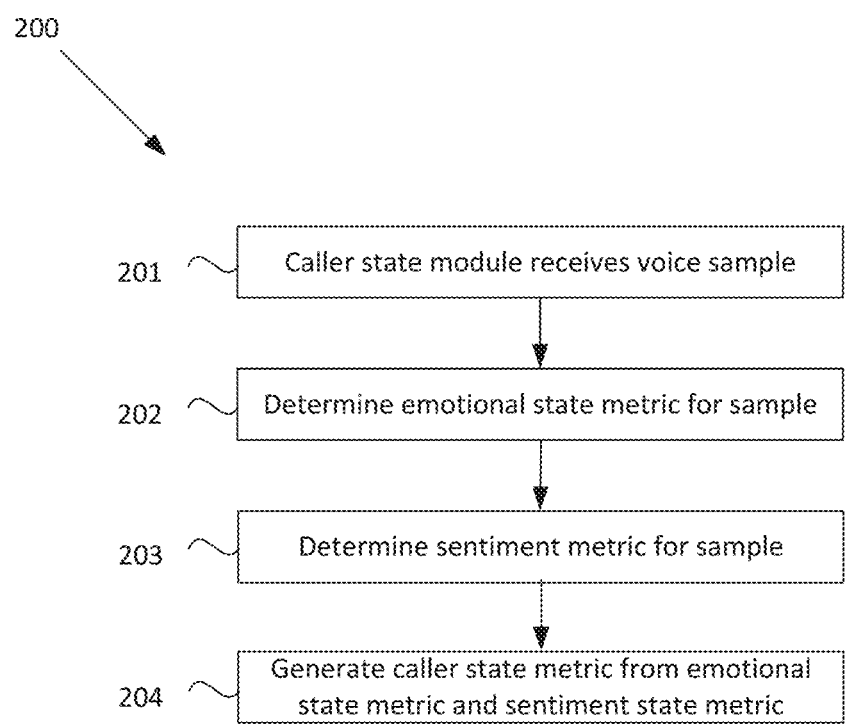
FIG. 2 shows a flowchart of a method for determining a caller state metric.

FIG. 2 depicts a flowchart 200 of a method for determining a caller state. At step 201, the caller state module 140 receives a sample of a voice recording. At step 202, the emotion analyzer module 142 processes the sample to determine an emotional state metric for the sample. At step 203, the sentiment analyzer module 144 process the sample to determine a sentiment metric for the sample. At step 204, the caller state module combines the emotional state metric and the sentiment metric to generate a caller state metric. The caller state metric can then be used to trigger subsequent actions.

Figure 3:
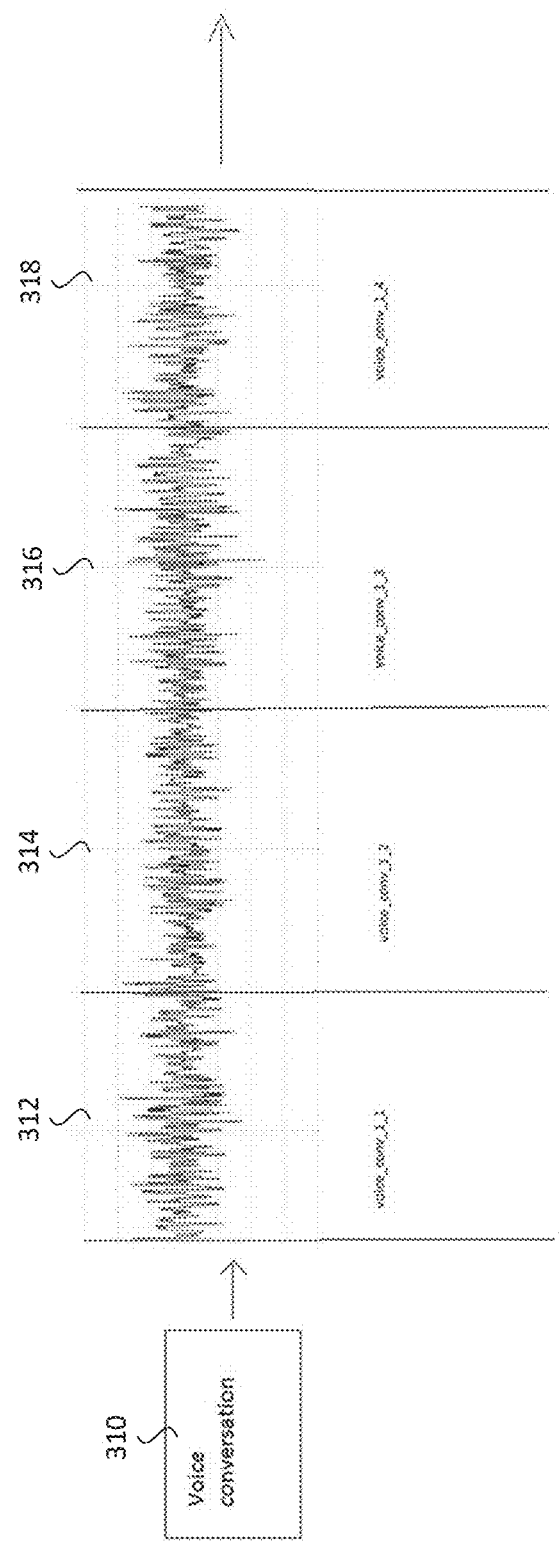
FIG. 3 shows a division of a voice recording into discrete samples.

In one embodiment, the voice recording may be divided into multiple samples or segments. FIG. 3 depicts how a voice recording 310 may be divided into multiple segments 312, 314, 316, 318. The voice recording may be sampled and segmented by the voice recording module 114 and/or the caller state module 140. The segments may be based on predetermined time periods, e.g. 1 minute, 2 minutes, etc. The segments may be based on speaker segments. For example, the conversation may be segmented into speaker segments for the caller and for the call agent. Other segmentation methods may be utilized and combinations of these methods may also be utilized. Each of the segments may be passed to the modules of the caller state module for individual processing. The emotional state metric, the sentiment state metric, and, subsequently, the caller state metric may be generated for each of the segments and combined to show the change in the metrics during the conversation.

Figure 4:
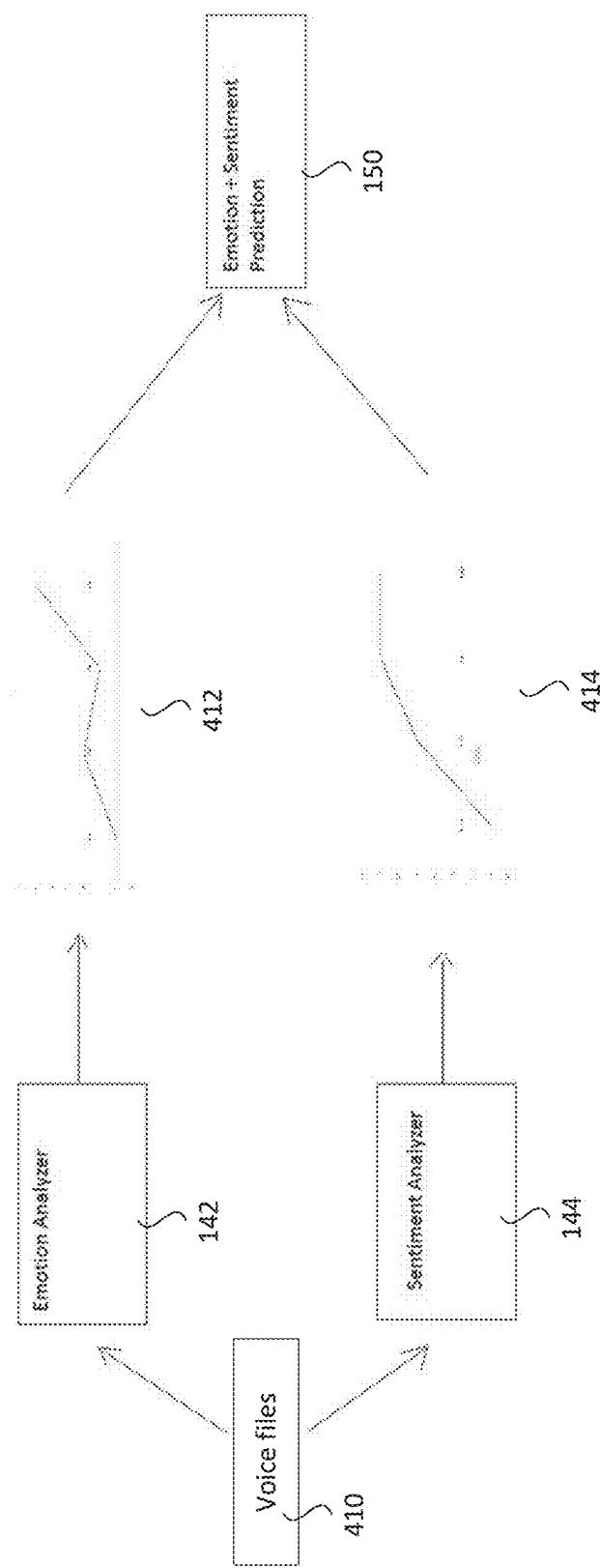
FIG. 4 depicts processing of a voice file to generate a caller state metric.

FIG. 4 shows how each of the emotion analyzer module 142 and the sentiment analyzer module 144 receives conversation samples 410 and generates their respective emotional state metric 412 and sentiment metrics 414 respectively. The metrics 412, 414 are provided to a caller state prediction module 416 that generates the caller state metric.

Figure 5:
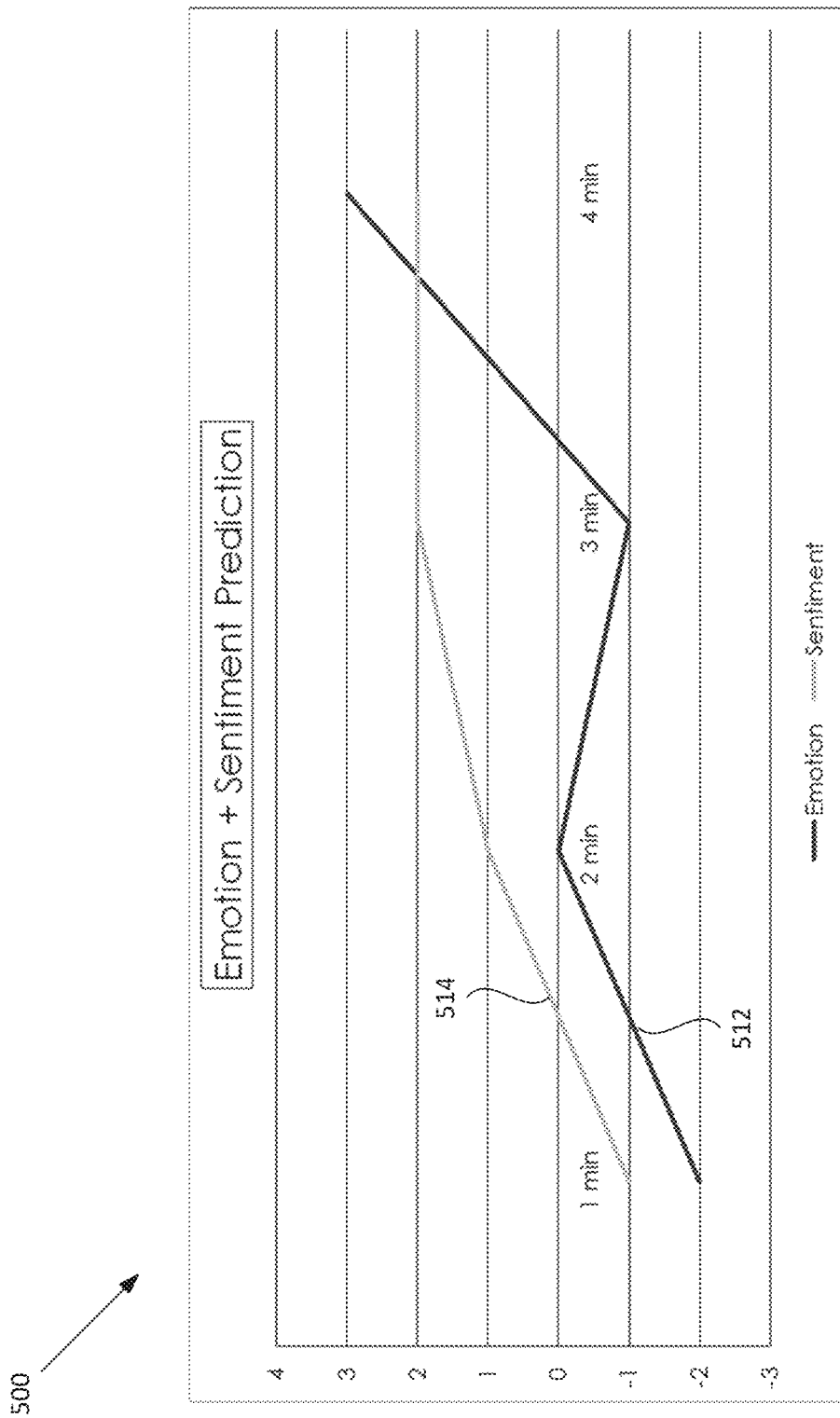
FIG. 5 depicts a graph of an emotion state metric and a sentiment metric.

FIG. 5 provides a graph representation 500 of each of the emotional state metric 512 and the sentiment metric 514 for the various segments of the conversation recording with nominal metric values.

Figure 6:
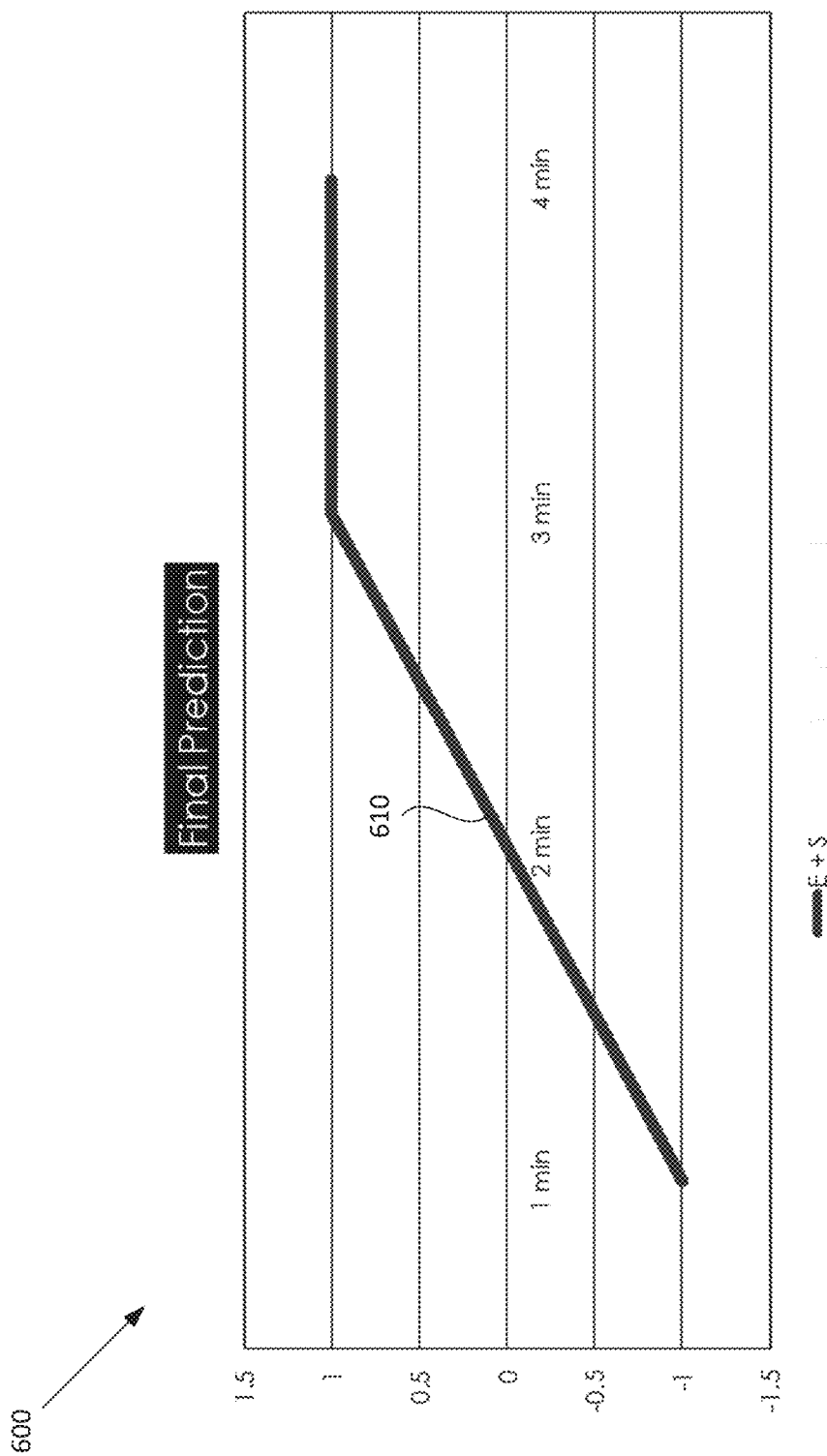
FIG. 6 depicts a graph of a caller state metric.

FIG. 6 provides a graph representation 600 of the prediction of the caller state 610 for the various segments of the conversation produced by combining the emotional state metric and sentiment metrics.

In one embodiment, the emotion analyzer module 142 may analyze sound parameters of the voice segments to generate the emotional state metric. Sound parameters may include parameters based on the waveform properties, i.e. sonic and audio qualities of the voice recording including, without limitation, volume, pitch, wavelength, frequency and any first or higher order derivatives of these parameters. In one embodiment, the emotion analyzer module 142 is comprised of a neural network which is trained with a database of labelled voice samples (e.g. anger, happy, etc.). New and unknown voice signals may then be provided to the neural network for determining the emotional state metric.

In one embodiment, the sentiment analyzer module 144 may include a speech to text sub-module 146 that transcribes the voice recording to text. The text is then further processed to analyze the words spoken. Words may be categorized with different sentiments, e.g. calm, moderate, satisfied, dissatisfied, aggressive, angry, etc. A categories database 148 may be accessed for this purpose. The frequency or rate at which words of these categories appear can be used to determine the sentiment metric.

The caller state prediction module 150 is programmed to combine the emotion state metric 412 and the sentiment metric 414 using an algorithm to thereby generate the prediction of caller state. The caller state may be an indicative value that.

In one example, the emotion state analyzer may detect one or more of a raised voice level, increased rate of words spoken, or increased pitch with a more agitated emotion state and output a higher value for the emotion state metric. The sentiment analyzer may output higher values when an increased rate of words in the aggressive or angry categories are detected compared to lower values when words in the calm or moderate categories are detected. When the emotion state metric and sentiment state metric values are combined, higher nominal values for the caller state metric may indicate greater agitation or dissatisfaction by the caller.

The caller state metric and/or the change in caller state metric across multiple voice samples may be used to trigger further actions. Triggers may be based on threshold values of the caller state metric and/or on changes in the caller state metric. In one embodiment, the caller state metric may be generated for a historical conversation, i.e. a conversation that is not currently active, and may be used as a training example. The caller state metric can be analyzed by a call agent, a call manager, other call center persons, or processing software, to identify one or more points during the conversation where the caller state changed. Changes may include both positive changes, where the caller state improved, or negative changes, where the caller state deteriorated. Inflection points may be correlated to agent actions, comments, speech or other aspects of the conversation to provide performance review of the agent.

Inflection points may also be correlated to a voice script followed by the agent to identify aspects of the voice script that triggered both improving caller state or deteriorating caller state. Analysis of multiple training examples may identify problem points of the voice script and may allow enhancements and improvements to the voice script to be made.

In one embodiment, voicemail recordings may be analyzed and a caller metric assigned to the voicemail recording. Threshold values of the caller state metric may trigger response actions, such as prioritizing a callback to the caller. In additional embodiments, caller ID may be used to identify multiple calls from a single caller and the emotional metric change over time can be detected. This information can be used to escalate/(take appropriate step) for the specific caller.

In one embodiment, voice recordings may be passed to the caller state module in real-time, i.e. during the conversation. The caller state module 140 may thus be able to generate a real-time caller state metric. The caller state metric may be monitored in real-time by the call agent and/or a supervisor. Certain caller states, or changes in caller state, may trigger actions at the call center. For example, a deteriorating caller state may trigger the call agent to take remedial actions, e.g. to change voice scripts, to offer a benefit to the caller, or to pass the call to a call supervisor. A deteriorating caller state may also be monitored by the supervisor. Trigger conditions or alarms on the caller state may prompt the supervisor to take actions to assist the caller. It can thus be seen that by monitoring a caller state in real-time, improvements in call handling leading to more favorable outcomes may result.

Figure 7:
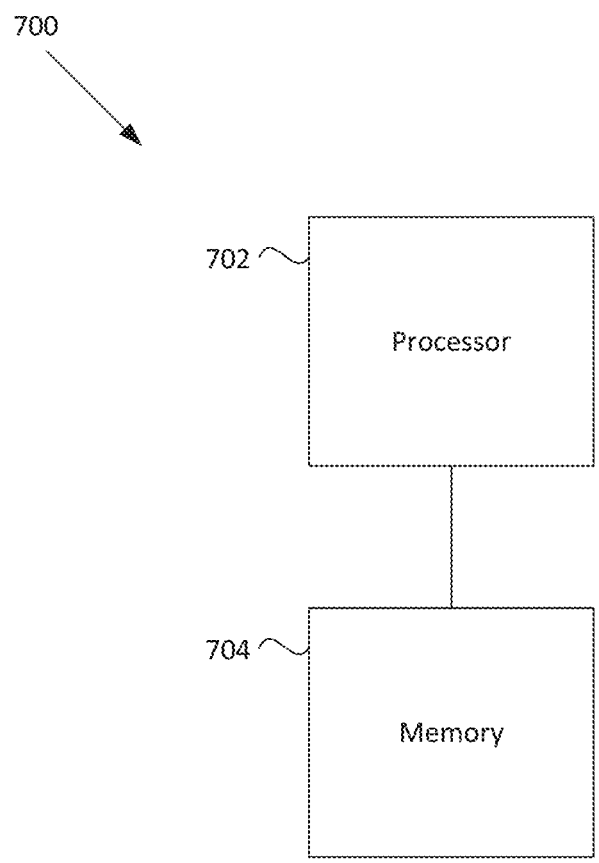
FIG. 7 depicts a process and memory that may be programmed to generate a caller state metric.

FIG. 7 shows an embodiment 700 of the caller state module. The caller state module 700 may include at least one processor 702 and at least one operatively associated memory 704. The memory 704 may store software, instructions, program code etc. that can be accessed and executed by the processor 702. The instructions may include instructions for processing a voice sample to determine an emotional state metric for the sample, process the sample to determine a sentiment metric for the sample, and combine the emotional state metric and the sentiment metric to generate a caller state metric.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A call center configured to be engaged in a call with a caller, the call center comprising:
a memory storing instructions; and
a processor that executes the instructions to:
analyze a sample of a plurality of voice recordings received from a user over a period of time:
generate, for each sample, an emotional state metric and a sentiment state metric based on the analysis of each sample;
generate, for each sample, a caller state metric based on a combination of the emotional state metric and the sentiment state metric;
identify a change in the caller state metric between each sample; and
identify an action to be taken by the call center based on the identified changes between the each caller metric.

2. The call center of claim 1, wherein, when the processor is to generate the emotional state metric, the processor further is to:
generate the emotional state metric from a waveform of the sample.

3. The call center of claim 2, wherein, when the processor is to generate the emotional state metric from a waveform, the processor further is to:
identify at least one of a pitch and a volume of the sample based on the waveform.

4. The call center of claim 1, wherein, when the processor is to generate the sentiment state metric, the processor further is to:
convert the sample into text;
identify an occurrence of words that are categorized according to a corresponding sentiment; and
generate the sentiment state metric based on a frequency of occurrence of the words.

5. The call center of claim 4, wherein the words that are categorized according to a corresponding sentiment are stored in a database.

6. The call center of claim 1, wherein the processor further is to:
divide each voice recording, of the plurality of voice recordings into a plurality of samples; and
generate a plurality of the caller metrics, each corresponding to a sample of the plurality of samples.

7. The call center of claim 6, wherein the processor further is to:
identify changes in the plurality of caller metrics.

8. A method for processing calls within a call center, the method comprising:
recording, by the call center, a plurality of voice calls from a user over a period of time;
analyzing, by the call center, a sample of each voice call of the plurality of voice calls:
generating, by the call center, and for each sample of the plurality of samples, an emotional state metric and for the a sentiment state metric based on the analyzing;
generating, by the call center, and for each sample, a caller state metric based on a combination of the emotional state metric and the sentiment state metric;
identifying, by the call center, a change in the caller state metric between each sample; and
identifying, by the call center, an action to be taken by the call center based on the identified changes between the each caller metric.

9. The method of claim 8, wherein the generating the emotional state metric further comprises:
identifying one or more sound parameters of the sample; and
identifying the emotional state based on the one or more sound parameters.

10. The method of claim 9, wherein the one or more sound parameters comprises at least one of:
a pitch of the sample; and
a volume of the sample.

11. The method of claim 9, comprising:
identifying a change in the one or more sound parameters occurring during the sample; and
identifying a change in the emotional state metric based on the change.

12. The method of claim 8, wherein the generating the sentiment state metric further:
converting the sample to text;
identifying an occurrence of words that are categorized according to a corresponding sentiment; and
generating the sentiment state metric based on a frequency of occurrence of the words.

13. The method of claim 12, wherein the words that are categorized according to a corresponding sentiment are stored in a database.

14. The method of claim 8, comprising:
dividing each voice call, of the plurality of voice calls, into a plurality of samples; and
generating a plurality of the caller metrics, each corresponding to a sample of the plurality of samples.

15. The method of claim 14, comprising:
identifying changes in the plurality of caller metrics.

16. The method of claim 15, comprising:
adjusting a script used by the call center to interact with the user based on the identifying changes in the plurality of caller metrics for the plurality of samples.

17. A non-transitory computer readable medium storing instructions that when executed by a processor of a call center cause the processor to perform:
analyzing a sample of each audio input, of a plurality of audio inputs, received from a user of the call center over a period of time;
generating, for each sample, an emotional state metric and a sentiment state metric;
generating, for each sample, a caller state metric based on a combination of the emotional state metric and the sentiment state metric
identifying a change in the caller state metric between each sample; and
identifying, by the call center, an action to be taken by the call center based on the identified changes between the each caller metric.

18. The non-transitory computer readable medium of claim 17, wherein the instructions further cause the processor to perform:
identifying a change in the caller state metric across a plurality of samples taken from the audio input.

19. The non-transitory computer readable medium of claim 17, wherein, when the processor is to perform the generating the sentiment state metric, the instructions further cause the processor to perform:
converting the audio input into text;
identifying an occurrence of words that are categorized according to a corresponding sentiment; and
generating the sentiment state metric based on a frequency of occurrence of the words.

20. The non-transitory computer readable medium of claim 17, wherein, when the processor is to perform the generating the emotional state metric, the instructions further cause the processor to perform:
identifying a waveform of the audio input; and
identifying the emotional state metric based on at least one of a pitch and a volume identified based on the waveform.

* * * * *